W. O'CONNELL.
TWO-IN-ONE RUBBER TIRE.
APPLICATION FILED DEC. 31, 1919.
1,422,123.
Patented July 11, 1922.
2 SHEETS—SHEET 2.
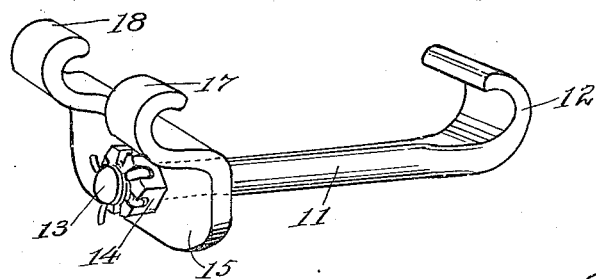
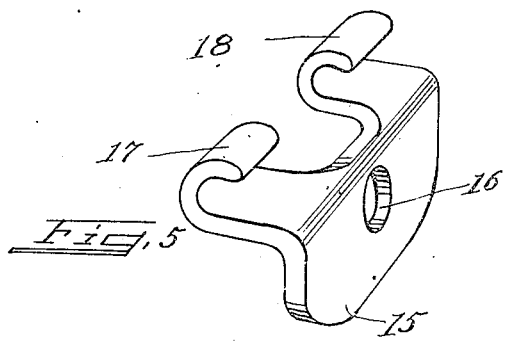
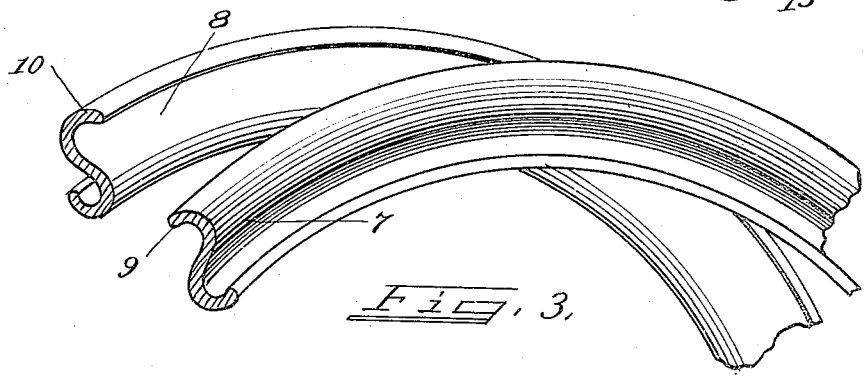
Inventor:
William O'Connell
By
T. V. Maxedon
Attorney.

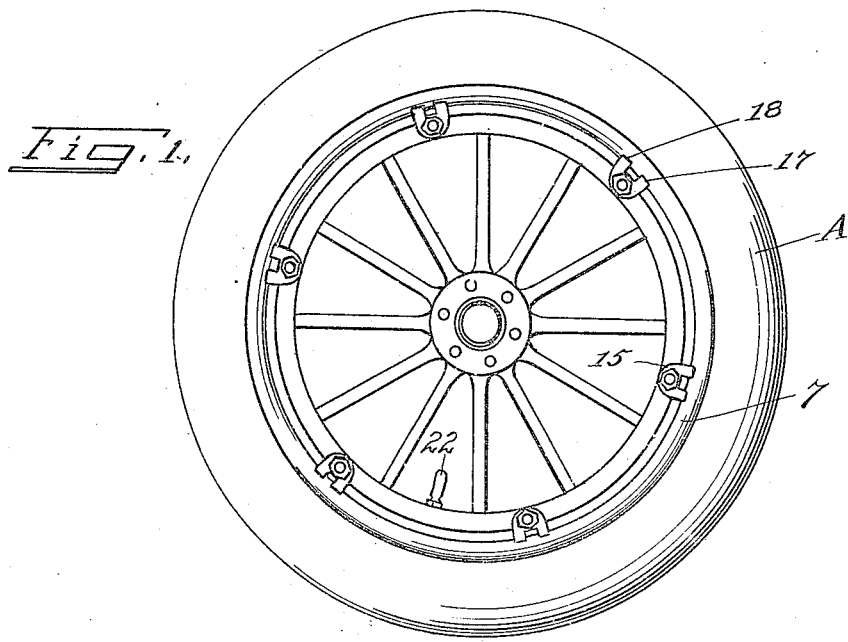
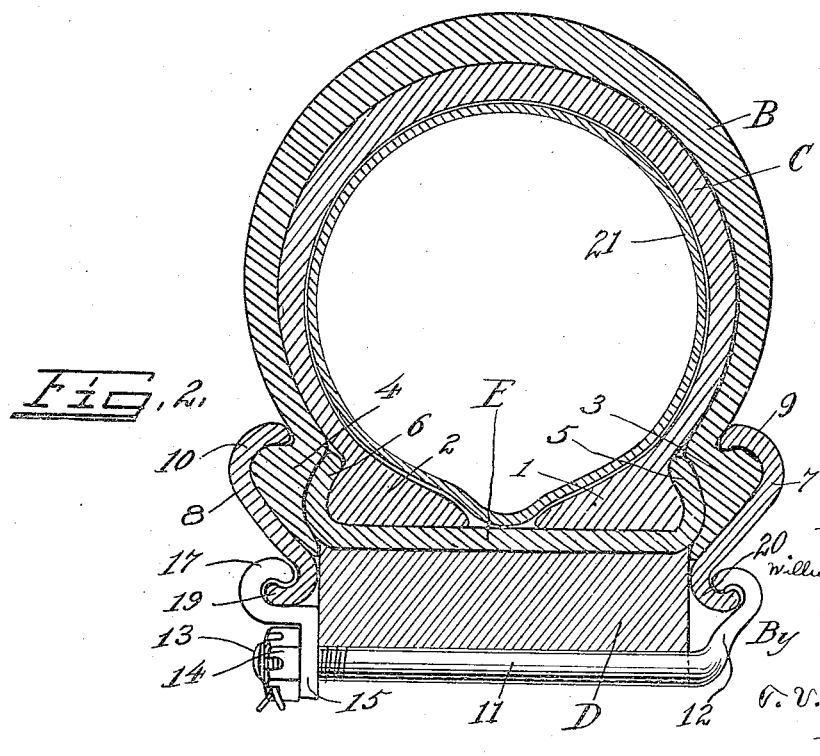

UNITED STATES PATENT OFFICE.

WILLIAM O'CONNELL, OF CINCINNATI, OHIO.

TWO-IN-ONE RUBBER TIRE.

1,422,123.  Specification of Letters Patent.  Patented July 11, 1922.

Application filed December 31, 1919. Serial No. 348,628.

*To all whom it may concern:*

Be it known that WILLIAM O'CONNELL, a citizen of the United States, residing at Cincinnati, in the county of Hamilton and State of Ohio, has invented new and useful Improvements in Two-in-One Rubber Tires, of which the following is a specification.

My invention relates to rubber tires for the wheels of vehicles and more especially to that class of rubber tires commonly known as two-in-one tires and employed most usually on automobiles.

The first and chief object of my invention is to afford a profitable use for worn tires. Secondary objects are to afford such a use of said tires, although they may be punctured, and do this with a saving of from 20 to 30 pounds of pressure. By my invention, even though worn tires are used and punctured at that, blow-outs will seldom ever occur. And again, by my invention the tire is made heavier than usual and more able to withstand the wear and tear of rough roads and the occasional ruts and holes in otherwise good and smooth roads.

I accomplish these objects by use of the mechanism hereinafter described and illustrated wherein like reference characters represent like parts in all figures.

Figure 1 is a side elevation of an automobile wheel equipped with my invention. Figure 2 is a cross section of my invention. Figure 3 is a perspective view of detached portions of my clamping rings showing their S-shaped formation in cross section. Figure 4 is a perspective view of the clamping device employed in connection with said clamping rings, showing the outer face of the double-hooked element or portion thereof and also the castle nut used in connection therewith. Figure 5 is a perspective view of said double-hooked element of said clamping device, showing the inner face thereof.

A is the wheel equipped with my invention. B is the outside rubber tire. C is the inside rubber tire. D is the rim of the wheel. E is the metal tire attached to said rim. 1 and 2 are the barbed clincher edges of the inside rubber tire. 3 and 4 are the barbed clincher edges of the outside rubber tire. 5 and 6 are the inturned edges of the metal tire E. 7 and 8 are the clamping rings whose formation in cross section is that of the letter S, the upper inturned edges 9 and 10 of which being adapted to hook onto the barbed edges 3 and 4 respectively of the outer rubber tire B. 11 is a bolt having a flattened inturned head 12 and a threaded end 13. 14 is a castle nut, adapted to screw onto the threaded end 13 of said bolt 11. 15 is a washer having a divided upper portion which is first bent outwardly and then inwardly, making a sort of goose-necked hook. Said washer is adapted to be mounted on said bolt by means of the perforation 16 therethrough, and its double hooks 17 and 18 are adapted to hook onto the lower outturned edge 19 of the clamping ring 8, and the flattened inturned head 12 of said bolt 11 is adapted to hook onto the lower outturned edge 20 of the clamping ring 7. Thus it is seen that the elements or members 11, 12, 13, 14, 15, 16, 17 and 18 make up and form a clamping device which, by the single operation of the nut 14 is caused to pull downwards and inwards upon the barbed edges 3 and 4 of the outer rubber tire B and clamp and tighten them onto the inturned edges of the metal tire E and also clamp and tighten the whole and entire outer rubber tire B onto the inner rubber tire C. 21 is the central pneumatic tube, and 22 is the outer end of the air tube leading thereto.

Having thus described my invention by illustrations and in detail, I will now describe it as a working mechanism.

Beginning with old tires that ought to be renewed, evidently the old tires will be worn down, so that, when the second set of old tires (for none but old tires are used) are put over the set already on the wheels, the barbed edges of the second set overlap the inturned edges of the metal tire of the wheel. The clamping rings are now put in place—one on each side of the wheel. Then the clamping device above described is put in position. Any suitable number of these clamping devices can be used. The air having in the first place been let run down and escape, when the second set of tires are adjusted the clamping device is only partially tightened. This makes a sort of basic adjustment of parts. Then the clamping device is tightened to its full strength and capacity. Then the air is applied. In putting on the second set of tires in this matter, it makes no difference if the tires (both sets) are badly worn, all that is necessary in putting on and adjusting the second set of tires is not to allow one puncture or one badly worn place to fit over and aline with another. In this way the best places along the inside tires press up against the worst places of the outside tire when the full pressure of air is applied. These two old and worn sets of tires in this way make as good, if not better, tire than a new set—that is one new set. By means of my invention, all discarded tires are put to economic use, and, as a matter of fact, all a person has to do, when starting out on a long run, is to supply himself with a couple of old worn tires.

The two-in-one tires as now constructed have rows of stitches against which the central pneumatic tube presses when inflated, and these stitches have a tendency to mar and cut the pneumatic tube. Of course, by my invention, all this trouble and expense is overcome.

By means of my invention, a set of two-in-one tires can be successfully run with from 20 to 30 pounds less air pressure than is ordinarily employed.

It is to be noted, also, that the widest horizontal portion of my two-in-one tire is on the line of the aforesaid clamping rings, therefore, when running up against a curb, said clamping rings scrape against the curb and protect the rubber tire, while, under present conditions, it is the rubber tire that scrapes against the curb.

A wheel equipped with my invention is heavier, stronger and better adapted to stand and endure rough usage than a wheel equipped with one set of new tire—and all this with a double set of worn tires that cost but a trifle.

Having thus described my invention by illustrations, in detail and as a working mechanism,

What I claim is:—

1. A wheel for vehicles provided with a rim and pneumatic tire thereon, and an auxiliary beaded casing embracing the main casing, of a pair of annular bands of an ogee curve in cross section forming oppositely disposed hooks, the hooked portion on one edge of the bands engaging the beads of the auxiliary casing, and the bodies of the bands lying against the outside inwardly sloping surfaces of the beads, and fastening devices secured underneath the wheel felloe and engaging the hooked portions of the other edge of the bands, with means for drawing the fastening devices toward each other to draw and lock the auxiliary casing in place.

2. A wheel for vehicles provided with a rim and pneumatic tire thereon, and an auxiliary beaded casing embracing the main casing, of a pair of annular bands of an ogee curve in cross section forming oppositely disposed hooks, the hooked portion on one edge of the bands engaging the beads of the auxiliary casing, and hooked members engaging the hooked portion of the opposite edge of the bands with a bolt extending underneath the wheel felloe for drawing the hooks towards each other to lock the bands in place.

In testimony whereof I have hereunto set my hand in presence of two subscribing witnesses.

WILLIAM O'CONNELL.

Witnesses:
F. FISCHER,
T. V. MAXEDON.